3,176,044
RECOVERY PROCESS
Malcolm Korach, Corpus Christi, Tex., assignor to Pittsburgh Plate Glass Company, Pittsburgh, Pa., a corporation of Pennsylvania
No Drawing. Filed Mar. 28, 1961, Ser. No. 98,752
10 Claims. (Cl. 260—633)

This invention relates to a novel method of recovering a chlorohydrin from an aqueous solution. It is particularly directed to recovery of the chlorohydrins of propylene, such as glycerine dichlorohydrin and propylene chlorohydrin.

Glycerine dichlorohydrin is frequently prepared by reaction of allyl chloride with chlorine in aqueous medium. In order to obtain a product in maximum yield, the solution is prepared in relatively dilute state. As a general rule, solutions containing less than 10 percent of the glycerine dichlorohydrin are prepared and usually, in order to obtain yields regarded as commercially satisfactory, it is desirable to produce solutions in this manner which contain from 2 to 4 percent, best yields being obtained when the glycerine dichlorohydrin in the water is held below 2 to 3 percent by weight.

The recovery of the dichlorohydrin from such a dilute mixture offers certain problems. While the mixture may be fractionated, this is expensive. Discovery of solvents which can be used effectively to recover the dichlorohydrin from the aqueous medium is difficult for a number of reasons. In the first place, some solvents react with the chlorohydrin. Others are not readily separated from the chlorohydrin after the extraction has been effected. Still others are insufficiently stable, and many have poor distribution coefficients. Many potential solvents are found to have either an undesirably high solubility in water or require large amounts of solvent in order to achieve an effective extraction of the dichlorohydrin from the water.

According to the present invention, it has been found that glycerol dichlorohydrin may be effectively removed from an aqueous solution thereof containing up to 2.5 percent by weight of HCl by extracting the solution with a liquid, substantially water-immiscible, organic phosphate ester. Of particular interest in this regard are the phosphate esters of aliphatic monohydric alcohols, which contain in excess of about 4 carbon atoms. Such esters have the advantage that they are non-toxic and can be safely used to extract the dichlorohydrin without contamination of the dichlorohydrin with toxic components. This is a desirable factor since the dichlorohydrin can be effectively used to produce glycerine and since glycerine often is used in foods where the presence of toxic materials is highly undesirable.

Typical alkyl phosphates which can be used for this purpose include tris-(2-ethyl hexyl) phosphate, tributyl phosphate, butyl dioctyl phosphate, tri-n-octyl phosphate, trihexyl phosphate, tridecyl phosphate, trioctadecyl phosphate.

It is also to be understood that aryl phosphate esters can be used in the same way. For example, tricresyl phosphate, dicresyl phenyl phosphate, diphenyl cresyl phosphate, triphenyl phosphate, 2-ethyl hexyl diphenyl phosphate, o-chlorophenyl diphenyl phosphate, bis-(p-tert-butyl phenyl) phenyl phosphate, didecyl phenyl phosphate are effective solvents for this purpose. Any of such solvents, however, have some toxicity and therefore it is necessary to ensure their separation from the dichlorohydrin by distillation or otherwise to a very exact degree.

For best results the phosphates of hydroxy compounds containing 6 or more carbon atoms should be used. The contemplated phosphate should have a water solubility below 1.0 gram (preferably below 0.10 gram) per liter at 20° C. and to facilitate separation from the chlorohydrin preferably should have a boiling point at 760 millimeter pressure above about 200° C. The phosphate esters herein contemplated have unusually high distribution coefficients for glycerol dichlorohydrin in aqueous medium. For example, tris-(2-ethyl hexyl) phosphate has a distribution coefficient of 15. That is, when a solution of the dichlorohydrin in water is shaken up with a quantity of this organic phosphate ester and the phases allowed to separate, the concentration of the dichlorohydrin in the liquid phosphate is found to be as much as 15 times the concentration of the dichlorohydrin in the aqueous phase. In the same way, the other phosphates herein contemplated have distribution coefficients of 7 to 15 or above. This distribution coefficient can be enhanced to even higher values by dissolving a water soluble salt, such as an alkali metal chloride or the like, in the dichlorohydrin solution.

A further advantage of these organic phosphates is that they can be readily separated from the dichlorohydrin after the extraction is complete. Thus, the dichlorohydrin can be conveniently distilled away from the liquid phosphate without recourse to complex fractionating techniques. Furthermore, they are stable under the conditions of extraction and have an extremely low solubility in water. Thus, there is little hazard of loss of solvent from the water phase.

The process can be carried out in a simple manner by contacting the aqueous dichlorohydrin solution with the solvent and allowing the phases to separate. The dichlorohydrin-liquid phosphate solution thus obtained is then heated to distill the dichlorohydrin from the solvent, and the solvent is recycled for extraction of further dichlorohydrin from aqueous solution.

The phosphate ester may be diluted if desired with various liquid diluents to improve the density or viscosity characteristics of the solvent phase. They should be inert and essentially insoluble in water. Such diluents include liquid hydrocarbons such as hexane, heptane, n-octane, methyl cyclohexane, ketones such as diisobutyl ketone, high boiling petroleum naphthas, kerosene, alpha-methyl naphthaline and the like.

The temperature of the extraction may be any convenient temperature at which the aqueous chlorohydrin solution and the solvent are in the liquid state. Temperatures of 15 to 100° C. are convenient. However, other temperatures may be permissible so long as the water solution of the chlorohydrin and the liquid phosphate ester (as such or when diluted with a diluent) remains in liquid state and neither the chlorohydrin nor the phosphate ester are hydrolyzed to an extent which is equivalent to more than about 50 pounds per ton of concentrated chlorohydrin produced.

It will be understood that the above process can be conducted continuously, for example, in an extraction column in which the solvent is fed into the bottom of the column and aqueous dichlorohydrin solution is fed into the top of the column. The organic solution is withdrawn from the top of the column and the water which has been denuded of the dichlorohydrin removed from the bottom of the column.

As previously indicated, an even sharper separation of the dichlorohydrin from the aqueous solution can be effected (i.e., the distribution coefficient increased in favor of the organic solvent) by establishing in the dichlorohydrin solution a substantial amount of an alkali metal halide, preferably alkali metal chloride, notably sodium chloride. The amount of such salt which is added normally should be in the range of 5 grams of salt per liter of dichlorohydrin solution up to saturation thereof.

The following examples are illustrative:

Example I

An aqueous solution containing 37 grams of 1,3-dichloro-2-propanol in three liters of water and containing about one percent by weight of HCl was prepared. Three hundred milliliter portions of this solution were shaken for one minutes with 50 milliliters of tri-o-cresyl phosphate and the mixture was allowed to stand until equilibrium was reached. The concentration of dichlorohydrin in the organic phase thus obtained and in the water phase was measured and the distribution coefficient was computed by dividing the concentration of the dichlorohydrin in grams per liter in the organic phase by the concentration of the dichlorohydrin in grams per liter in the aqueous phase and found to be 7.4. A similar test was made using a portion of the solution containing 30 grams of NaCl per liter of solution. The distribution coffieicent was found to be 8.5.

Example II

The process of Example I was repeated using tris-(2-ethyl hexyl) phosphate. The distribution coefficient at 25° C. was found to be 15.5 and using a solution containing 30 grams of NaCl per liter, this coefficient was found to be 19.8.

The following table lists the distribution coefficients of other phosphates determined in the same way:

| | Glycerine Dichlorohydrin Solution Containing— | |
| --- | --- | --- |
| | No NaCl | 30 grams of NaCl per liter of Solution |
| 2-ethyl hexyl diphenyl phosphate | 10.3 | 11.5 |
| Cresyl phenyl phosphate (commercial mixture) | 7.9 | 9.0 |
| O-Chlorophenyl diphenyl phosphate | 6.3 | 7.2 |
| Bis-(p-tert-butyl phenyl)phosphate | 4.4 | 7.1 |

Example III

An aqueous solution containing 4.12 percent by weight of 1,3-dichloro-2-propanol and 1 percent by weight of HCl was fed into the top of a packed jacketed column 4 feet long and 1 inch in diameter (while holding the temperature of the jacket at 62° C.) at a rate of 2.5 milliliters of solution per minute. Commercial tricresyl phosphate was fed into the bottom of the column at 2.5 milliliters per minute and the liquids fed to the column were held at 55° C., this solvent being withdrawn from the top of the column and the aqueous phase from the bottom thereof. Ninety-two percent of the above dichlorohydrin was extracted by the tricresyl phosphate withdrawn from the top of the column.

The process herein contemplated is especially useful for the improvement of the yield of glycerol dichlorohydrin and like chlorohydrins. Thus it is known that such chlorohydrins can be prepared by reacting an olefin such as ethylene, propylene, butylene or the chloro derivatives thereof such as allyl chloride with chlorine in aqueous medium. Because of the problems entailed in recovery of the chlorohydrin or its corresponding epoxide this material normally is produced in concentrations of 3 to 6 percent or more by weight. Yields are rarely in excess of 90 percent of theoretical.

In the present process, it is possible to make and recover chlorohydrins in concentrations below 2 to 3 percent by weight simply by controlling the amount of water present during the reaction and extracting the resulting solution with a liquid phosphate ester of the type above described. By so doing it is possible to produce and extract the chlorohydrin in amounts of 95 percent and more of theoretical. This constitutes an important economic advantage over other processes.

The following example is illustrative:

Example IV

An aqueous solution of glycerol dichlorohydrin was formed by circulating a stream of water in a cyclic path at a rate of 1.8 gallons per minute through a tower 25 inches long and 71 millimeters in diameter, withdrawing water from the top of the tower and feeding it into the bottom thereof while feeding liquid allyl chloride into the bottom of the tower at the rate of 2 cubic centimeters per minute and chlorine also at the bottom of the tower sufficient to supply about 2 percent excess chlorine, based upon the allyl chloride. After the concentration of glycerol chlorohydrin built up to about 1.83 percent, water was fed into the circulation system and the solution was continuously withdrawn, the chlorohydrin concentration being held at about 1.83 percent by weight. The yield of chlorohydrin was about 95.8 percent of theoretical based upon the allyl chloride.

A quantity of this aqueous solution is extracted as in Example III with tris-(2-ethyl hexyl) phosphate and the chlorohydrin is substantially completely extracted in the phosphate ester.

According to the present invention, it has also been found that other chlorohydrins can be separated from aqueous solution in the same way. For example, propylene chlorohydrin may be extracted from an aqueous solution containing propylene chlorohydrin and using the solvents herein contemplated.

In like manner, butylene chlorohydrin, butadiene chlorohydrin, or isobutylene chlorohydrin or like chlorohydrin containing up to 4 carbon atoms may be extracted from aqueous solution. Ethylene chlorohydrin may be so extracted.

Although the present invention has been described with reference to the specific details of certain embodiments thereof, it is not intended that such details shall be regarded as limitations upon the scope of the invention except insofar as included in the accompanying claims.

I claim:

1. A method of recovering from aqueous solution an aliphatic chlorohydrin containing up to 4 carbon atoms which comprises extracting said chlorohydrin from said aqueous solution with a liquid organic phosphate ester selected from the group consisting of alkyl phosphates and aryl phosphates containing at least 6 carbon atoms, said phosphate having a solubility in water below 1 gram per liter of water at 20° C. and a boiling point above 200° C. at 760 mm. of mercury and separating said chlorohydrin from said phosphate ester.

2. The method of claim 1 wherein the chlorohydrin is glycerol dichlorohydrin.

3. The method of claim 1 wherein the aqueous solution of chlorohydrin contains alkali metal halide.

4. The method of claim 1 wherein the alkali metal halide is sodium chloride.

5. The process of claim 1 wherein the ester is trioctyl phosphate.

6. The process of claim 1 wherein the phosphate is an ester of a hydroxy compound containing at least 6 carbon atoms.

7. The process of claim 1 where the ester is tris-(2-ethylhexyl)phosphate.

8. A method of recovering an aliphatic chlorohydrin containing up to 4 carbon atoms which comprises reacting an ethylenic compound which contains up to 4 carbon atoms with chlorine in the presence of enough water to insure production of a chlorohydrin solution containing less than 10 percent by weight of chlorohydrin and extracting said chlorohydrin from said solution with a liquid organic phosphate ester selected from the group consisting of alkyl phosphates and aryl phosphates containing at least 6 carbon atoms, said phosphate having a solubility in water below 1 gram per liter of water at 20° C. and a boiling point above 200° C. at 760 mm. of mercury and separating said chlorohydrin from said phosphate ester.

9. A method of recovering from aqueous solution glycerine dichlorohydrin which comprises reacting allyl chloride with chlorine in the presence of enough water to insure production of a glycerine dichlorohydrin solution which contains less than 10 percent by weight glycerine dichlorohydrin and extracting said dichlorohydrin from said solution with a liquid organic phosphate ester selected from the group consisting of alkyl phosphates and aryl phosphates containing at least 6 carbon atoms, said phosphate having a solubility in water of less than 1 gram per liter of water at 20° C. and a boiling point above 200° C. at 760 mm. of mercury and separating said dichlorohydrin from said phosphate ester.

10. A method of separating a halohydrin containing up to 4 carbon atoms from an aqueous solution containing said halohydrin which comprises extracting said solution with a liquid, organic phosphate ester selected from the group consisting of alkyl and aryl phosphate esters containing at least 6 carbon atoms and having a solubility in water below 1 gram per liter of water at 20° C. and a boiling point above 200° C. at 760 mm. of mercury to remove said halohydrin from said aqueous solution and transfer said halohydrin into said organic phosphate ester.

References Cited by the Examiner
UNITED STATES PATENTS 1,826,369  10/31  Schoenburg et al. _____ 260—627
2,456,350  12/48  Weizmann _____ 260—634

LEON ZITVER, *Primary Examiner.*